United States Patent [19]

Deutschenbaur et al.

[11] 4,157,677
[45] Jun. 12, 1979

[54] SELF-DRILLING DOWEL WITH DRILL HEAD

[75] Inventors: Paul Deutschenbaur, Unterpfaffenhofen; Wolfgang Lippacher, Breitbrunn, both of Fed. Rep. of Germany

[73] Assignee: Hilti Aktiengesellschaft, Schaan, Liechtenstein

[21] Appl. No.: 845,662

[22] Filed: Oct. 26, 1977

[30] Foreign Application Priority Data

Nov. 4, 1976 [DE] Fed. Rep. of Germany ....... 2650598

[51] Int. Cl.² .............................................. E04B 1/49
[52] U.S. Cl. ........................................... 85/68; 85/72; 85/74; 85/79; 175/385
[58] Field of Search ............... 175/385, 414, 415, 417, 175/420; 85/68, 72, 74, 79; 61/45.8; 299/23

[56] References Cited

U.S. PATENT DOCUMENTS

| 3,403,593 | 10/1968 | Moore | 85/68 |
| 3,960,223 | 6/1976 | Kleine | 175/415 X |
| 4,007,795 | 2/1977 | Gawron et al. | 175/414 X |
| 4,026,186 | 5/1977 | Williams, Jr. et al. | 85/68 |

FOREIGN PATENT DOCUMENTS

| 227041 | 2/1960 | Australia | 85/47 |
| 2333349 | 1/1975 | Fed. Rep. of Germany | 85/68 |

| 14637 | 2/1914 | United Kingdom | 175/420 |

Primary Examiner—Ernest R. Purser
Assistant Examiner—Nick A. Nichols, Jr.
Attorney, Agent, or Firm—Toren, McGeady and Stanger

[57] ABSTRACT

A self-drilling dowel has a drill head extending across its leading end. A bore extending through the dowel from its trailing end is closed at its leading end by the drill head forming a centrally located blind bore. The blind bore is cylindrically shaped for a part of its axial length from the trailing end of the dowel with the remainder of its axial length to its closed end tapering inwardly from the surface of the cylindrically shaped part. A spreader is positionable in the central bore with complementary dimensioned surfaces relative to the cylindrically shaped and tapering parts of the bore. Slots are formed in the dowel and extend from the drill head to approximately the transition plane between the cylindrically shaped and tapering parts of the blind bore. The slots have a dimension extending transversely of the axis of the bore just sufficient to open into the bore at the transition plane. The drill head has a centering point projecting outwardly from the remainder of its surface at the leading end of the dowel. The part of the drill head forming the centering point is shaped so that it can separate from the dowel when the spreader is driven through the central bore toward the leading end of the dowel.

13 Claims, 3 Drawing Figures

SELF-DRILLING DOWEL WITH DRILL HEAD

SUMMARY OF THE INVENTION

The present invention is directed to a self-drilling dowel and, more particularly, it concerns a self-drilling dowel where the drill head extends across the leading end of the dowel forming a central blind bore in the dowel. Further, the walls of the dowel are slotted for a portion of its axial length from the leading end with the slots terminating at the location where the central bore changes from a cylindrical part to an inwardly tapering part. The cylindrical part extends from the trailing end of the dowel while the tapering part extends between the cylindrical part and the inner surface of the drill head. A spreader is positionable within the dowel and has two axially extending parts, one corresponding to the cylindrically shaped part of the bore and the other to the tapering part of the bore.

Tubular self-drilling dowels having a drill head at the leading end are known. These known self-drilling dowels include a central bore which widens toward the drill head end and is arranged to hold a correspondingly shaped spreader.

These known self-drilling dowels are inserted into a hammering drill which applies both a rotating and a hammering action causing the dowel to drill a borehole into the target material. As the drill head moves inwardly into the target material it crushes the material into different size particles.

The smaller of the particles, usually of a dust-like consistency, are removed during the drilling action by grooves formed helically or axially on the outer surface of the dowel. The larger particles, however, which are not crushed to a dust-like consistency, collect in the central bore and tend to form a tightly packed plug. When the drilling operation has been completed, the self-drilling dowel has to be removed from the borehole to facilitate the removal of the packed drilled material from the central bore. Moreover, the borehole has to be cleared of any remaining drilled material. After the borehole has been cleared and the central bore of the self-drilling dowel is cleaned out, a spreader can be positioned in the drill head end of the dowel. By applying a striking movement to the trailing end of the dowel, the spreader in contact with the bottom of the borehole is forced into the central bore at the leading end of the dowel, causing the dowel to spread radially and become anchored into the target material in which the borehole is formed. The radial spreading of the dowel is facilitated by elongated slots formed in the dowel and extending for a portion of its length from the drill head end.

Placement of these known dowels is adversely affected by relatively time-consuming placement methods, primarily the time lost is caused in clearing the borehole formed in the target material and in cleaning out the central bore of the dowel. The cleaning steps are especially important in achieving adequate anchoring values, since the proper securement of the dowels could not be achieved if the cleaning of the borehole and the central bore in the dowel are not properly performed. In addition, removing the self-drilling dowel from a borehole is sometimes so difficult that a so-called "stirring" of the tool driving the dowel takes place and this "stirring" action causes the development of radially acting forces within the borehole. Such forces tend to result in the enlargement of the borehole facilitating removal of the dowel, however, it also leads to inadequate anchoring of the dowel. Moreover, it is disadvantageous if the dowel is shifted axially within the borehole during the spreading operation, since the borehole might be enlarged in the spreading area of the dowel resulting in a certain amount of slippage when forces are applied to the anchor dowel.

Another type of known self-drilling dowels combines the feature of the tubular member with a drill head on its leading end. Unlike the self-drilling dowels described above, these known dowels have a central bore which tapers inwardly toward the leading end or drill head end of the dowel. With such dowels, a correspondingly shaped tapering spreader is inserted from the rear or trailing end into the central bore and effects a radial enlargement of the dowel as it is driven forwardly into the bore.

Under certain conditions, these known self-drilling dowels do not have to be removed from the prepared borehole in the target material, accordingly, the disadvantages described above involving the removal of the dowel do not take place, that is, the possibility of enlarging the borehole which is formed. Since the drill head on such dowels are ring shaped, the material drilled out in forming the hole is crushed into various sized particles. In the center of the borehole the drilled material is usually crushed to an insufficient degree, tending to cause the development of a tightly packed plug within the dowel. Under certain circumstances the removal of such a plug can be difficult, making it necessary to remove the dowel from the borehole. With such a dowel it is also very important to clean out the central bore thoroughly before the spreader is inserted. Such a cleaning operation extends the time required for completing the anchoring of the dowel.

Therefore, a primary object of the present invention is to provide a self-drilling dowel which can be economically set and which assures the achievement of high anchoring values.

In accordance with the present invention, the difficulties experienced in the past are overcome by providing a central bore in the dowel which is closed at the leading end by a drill head so that a blind bore is provided extending from the trailing end to the inner surface of the drill head.

Based on the present invention, a tubular shaped self-drilling dowel is provided closed at its leading end. Contrary to the drill head of previously known dowels, the present self-drilling dowel is shaped in a form similar to a casing head. Accordingly, during the drilling operation, not only is an annular area of the drill hole ground, but the entire circular surface of the target material is ground by the teeth on the drill head. As a result, all of the material within the borehole is uniformly and finely ground into a material having a dust-like consistency. Such materials, in the form of dust, can move out of the borehole making it unnecessary to extract the dowel to obtain proper cleaning of the borehole. Because of the closed leading end configuration of the dowel affording a blind-end bore, the dust developed in the drilling operation cannot penetrate into the bore so that it is not necessary to clean out the central bore in the dowel. Accordingly, a spreader can be positioned in the central blind bore before commencement of the drilling step. When the drilling step has been completed, the spreader can be driven forwardly through the bore toward the leading end by a tool providing a hammering action, such as a breaking tool. By displacing the walls of the dowel radially outwardly by means of the spreader, the dowel can be anchored in the target material. To facilitate radial spreading, elongated slots can be formed in the dowel in a known fashion. Accordingly, it is possible for the dowel to break open along the slots.

Another feature of the invention is the provision of a centering point located in the axial center of the drill head with the point projecting forwardly from the remaining leading end surface of the drill head. This arrangement facilitates the commencement of drilling of a borehole. Accordingly, a so-called "run off" of the dowel, caused by the drill head acting against the surface of the target material, is prevented. As the drilling continues, the centering point assists of the crushing of the material within the hole.

When the self-drilling dowel of the present invention is spread by driving a spreader through the central bore in the dowel, it is possible to destroy, or at least separate, the central portion of the drill head containing the centering point from the remainder of the drill head. With this arrangement the displacement of the spreader through the dowel will not be impeded as it moves toward the blind end of the bore. The separation of the center portion of the drill head is facilitated by the arrangement of the slots in the dowel.

Such a dowel can be equipped with known attachment means at its trailing end. Such attachment means can be a male or female thread or collar or similar device arranged on the end of the dowel. At its trailing end, the self-drilling dowel can be provided with a transverse slot for applying torque to it during the drilling of the borehole. By means of such a transverse slot, the connection between the dowel and the hammer drill can be facilitated and it is unnecessary to provide separate fixtures on the dowel for connection to the rotating tool.

The primary purpose of the elongated slots is to facilitate the radial enlargement of the dowel during the spreading operation. On the other hand, however, during the drilling operation the dowel is not supposed to enlarge radially, rather it must maintain its outside cylindrical shape. Accordingly, the elongated slots do not extend completely into the central bore, instead a thin layer of material in the dowel separates the slots from the bore. While the slots are separated from the bore in the dowel during the drilling operation, the thin layer of material will separate during the spreading operation facilitating anchoring of the dowel.

In the dowel embodying the present invention, a similar arrangement of the slots is provided so that the slots remain closed to the interior of the central bore while improving the ability of the slots to expand and permit the dowel to become anchored within the borehole. The depth of the slots into the dowel wall is such that the slots are closed to the interior of the central bore except at the transition area between the cylindrical part and the tapering part of the bore. In the transition area the separating wall between the slot and the bore is either very thin or an opening is provided which can be closed by the spreader positioned within the bore. With the inner surface of the bore tapering inwardly to the drill head, the material separating the slot from the bore is thickest adjacent the drill head where the forces occurring during the drilling operation are the strongest. With such an arrangement, it is possible to maintain the integrity of the material separating the slot from the bore and to assure that no accidental breakage occurs during drilling. At the ends of the slots spaced from the drill head, that is, in the transition area of the bore, relatively small forces are developed during drilling. The small thickness of the material, however, decidedly facilitates the breaking open of the material along the slots when the spreader is driven through the central bore toward the drill head. It is particularly advantageous to keep the axial length of any opening between the slots and the central bore as small as possible.

Preferably, the depth of the slots inwardly into the dowel wall is a constant dimension over their entire length and corresponds approximately to the thickness of the walls of the dowel in the range of the cylindrical part of the bore. Accordingly, the layer of material between the slots and the bore increases in thickness from the inside surface of the drill head to the transition area within the bore. As mentioned above, the separating wall between the slot and the bore has its least dimension in the transition from the cylindrical to the tapering part of the bore and it is possible that an opening of small axial length may be provided in the transition area affording an opening between the slot and the bore.

In accordance with another embodiment of the invention, the spreader positioned within the central blind bore provides a closure for any opening between the slots and the bore. Accordingly, any dust from the drilling operation cannot pass into the bore. At the same time, the thickness of the separating wall between the slots and the bore is optimized for assuring the separation of the material when the dowel is spread radially outwardly. With this arrangement, the central bore in the dowel is maintained dust free and any female threads within the bore are maintained absolutely clean.

To facilitate removal of the dust generated during the drilling operation, grooves are formed in the outer surface of the dowel. These grooves may extend either helically or axially along the dowel. In cross section, the grooves can have the shape of a circular segment or of a rectangle with a curved leg.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 2:
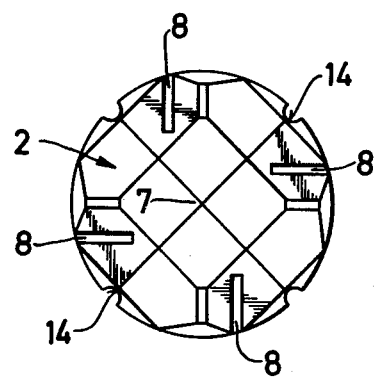
FIG. 2 is an end view of the leading end of the dowel taken in the direction of the arrow A shown in FIG. 1.
Figure 1:
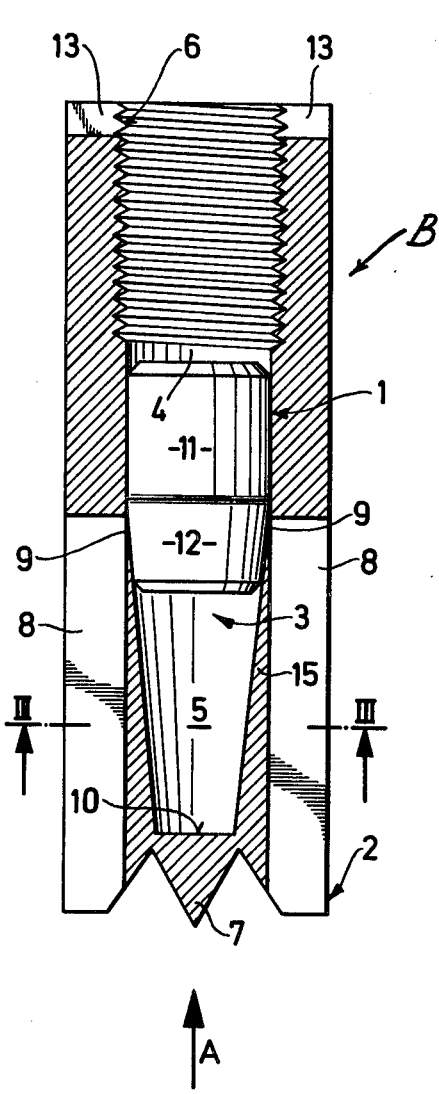
FIG. 1 is a longitudinal sectional view through a self-drilling dowel embodying the present invention.

In FIG. 1 a self-drilling dowel is illustrated consisting of a rod-like member B and a spreader 1 positioned within the member with a drill head 2 extending completely across the leading end of the rod-like member so that its hollow interior forms a blind bore 3. In the drawing the drill head 2 is located at the leading end of the rod-shaped member B, that is, the lower end is viewed in FIG. 1, the end which is placed against a receiving or target material for drilling a borehole into which the dowel is subsequently anchored. The central blind bore 3 consists of a first axially extending part 4 and a second axially extending part 5 with the central portion 10 of the drill head closing the end of the second part adjacent the leading end of the dowel. The first part 4 is cylindrically shaped while the second part 5 tapers inwardly from the cylindrically shaped part to the part 10 of the drill head. The cylindrically shaped first part 4 of the blind bore 3 has a female thread 6 extending for a portion of its axial length from the trailing end of the dowel. Drill head 2 encircles its central part 10 and the outwardly facing surface of the central part forms a centering point 7 which projects outwardly beyond the remaining leading end surfaces of the drill head. Extending axially from the leading end or drill head 2 are a plurality of elongated slots 8 which extend for a part of the axial length of the rod-like member B. In FIGS. 1 and 2, the slots 8 are shown extending inwardly through the wall of the member B. However, the slots do not extend radially inwardly, rather they have a chordal orientation so that a prolongation of the slots extends offset from the axis of the rod-like member. For their axial length, the slots have a constant transverse dimension within the wall of the rod-like member with the constant dimension being approximately equal to the wall thickness of the dowel in the cylindrically shaped first part 4 of the bore. As can be seen in the sectional view of FIG. 1, the walls of the dowel taper inwardly through the second part of the bore so that the slots are separated from the interior of the bore by the increasing thickness of the dowel wall as it approaches the leading end of the dowel. At the transversely extending transition plane between the first part 4 and second part 5 of the bore, openings 9 extend between the slots 8 and the bore 3. These slots are of limited length in the axial direction of the bore. As can be noted in FIG. 1, the spreader 1 positioned within the bore 3 provides a closure for the openings 9 between the slots and the bore. As long as the spreader is inserted so that its frusto-conical surface engages the complementary shaped surfaces in the bore part 5, the spreader will effectively close the openings 9.

The spreader 1 has a cylindrically shaped first part 11 and a frusto-conically shaped or tapering second part 12. The first part 11 has a diameter substantially the same as the diameter of the first part 4 of the bore 3 so that the spreader can be moved in sliding contact with the first part as it is driven into the bore 3 toward the leading end. The frusto-conically shaped second part 12 is complementary to the corresponding wider end surfaces of the second part 5 of the bore. When the spreader is driven toward the leading end of the dowel, the interaction of the spreader and the surface of the second part 5 of the bore 3 causes a uniform radial enlargement of the dowel along the axial length of a substantial portion of the second part of the bore affording improved anchoring values for the dowel within the borehole it has formed.

Figure 3:
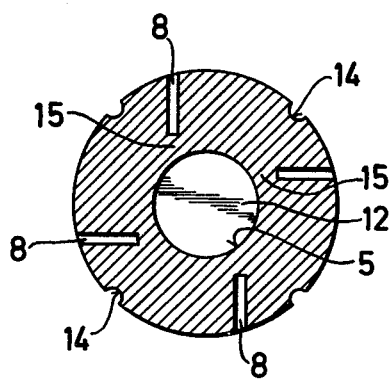
FIG. 3 is a transverse sectional view of the dowel taken along the line III—III in FIG. 1.

For interconnection to setting tools, such as hammer drills and the like, a groove-like recess 13 is formed in the trailing end of the rod-like member B to facilitate the transmission of rotational movement to the dowel. As can be seen in FIGS. 2 and 3, the outer surface of the dowel has generally axially extending grooves 14 for the removal of dust generated in the drilling operation.

The number, distribution and shape of the grooves can be selected as desired. For example, helically extending grooves, instead of the axial grooves shown in the drawings, can be used. Further, the grooves can have varying cross sections.

Moreover, the shape and distribution of the elongated slots 8, as shown in FIGS. 2 and 3, can be varied as desired. To achieve the full benefit of the self-drilling dowel embodying the present invention, it is only necessary to chose the depth, general arrangement and length of the slots in such a way that openings or very thin walls are arranged in the region of the transition plane between the first and second parts of the bore 3. The provision of openings or very thin wall parts in this region of the bore facilitates the breaking of the material 15 located inwardly of the slots so that an optimum radial enlargement of the dowel can be effected as the spreader 1 is displaced axially through the bore 3 toward the drill head 2 or leading end of the dowel.

While specific embodiments of the invention have been shown and described in detail to illustrate the application of the inventive principles, it will be understood that the invention may be embodied otherwise without departing from such principles.

What is claimed is:

1. A self-drilling dowel comprising an axially extending rod-like member having a leading end arranged to be placed against a target material for drilling a borehole in the material and an oppositely directed trailing end, a drill head formed on the leading end of said member, elongated slots formed in said member and extending from the leading end toward the trailing end thereof, an axially extending central bore in said member having an axially extending cylindrically shaped first part extending from the trailing end for a portion of the axial length of said member and an axially extending second part extending from the end of said first part spaced from the trailing end and the surface of said second part tapering inwardly from the surface of the cylindrically shaped first part in the direction toward the leading end, an axially extending spreader member positionable within said central bore and having an axially extending first part and an axially extending second part with said second part of said spreader member having a tapering surface complementary to the surface of said second part of said central bore, said rod-like member having debris removing means for the removal of drilled material from the borehole, wherein the improvement comprises that said central bore is a blind bore being closed at the leading end of said rod-like member by said drill head with said drill head extending transversely across the full extent of the leading end of said rod-like member.

2. A self-drilling dowel, as set forth in claim 1, wherein said debris removing means comprises grooves formed in the outer surface of said rod-like member extend generally in the axial direction thereof.

3. A self-drilling dowel, as set forth in claim 1, wherein a slot formed in the trailing end of said rod-like member extends transversely of the axial direction thereof for providing a connection between said dowel and a tool for rotating and hammering said dowel.

4. A self-drilling dowel, as set forth in claim 1, wherein connecting means are formed on said rod-like member adjacent the trailing end thereof for connecting another member to said dowel.

5. A self-drilling dowel, as set forth in claim 1, wherein the outer surface of said rod-like member has a uniform transverse cross-sectional shape and size for the axial length thereof.

6. A self-drilling dowel, as set forth in claim 1, wherein said drill head includes a centering point formed integrally therewith and protruding outwardly beyond the remainder of said drill head in the axial direction of and away from said rod-like member.

7. A self-drilling dowel, as set forth in claim 6, wherein said drill head includes an integral central part extending transversely of the axis of said rod-like member and being spaced radially inwardly of the slots at the leading end of said rod-like member, said central part forming at least a part of the blind end of said central bore, said central part being joined to the remainder of said drill head along a reduced thickness wall section so that said central part is separable from the remainder of said drill head when said spreader member is driven axially through the second part of said central bore toward the leading end of said dowel.

8. A self-drilling dowel, as set forth in claim 1, wherein said slots terminate in said rod-like member approximately at the transverse plane defining the transition from said first part to said second part of said central bore.

9. A self-drilling dowel, as set forth in claim 8, wherein said slots have a constant dimension in the direction transverse to the axial direction of said bore and said constant dimension being such as to form an opening in the second part of said central bore extending between said slot and said bore only adjacent the transition plane between the first and second parts of said central bore.

10. A self-drilling dowel, as set forth in claim 9, wherein the dimension of said slots extending in the direction transverse to the axis of said bore being approximately equal to the wall thickness of said rod-like member in the region of said first part of said central bore.

11. A self-drilling dowel, as set forth in claim 9, wherein said slots extend chordally of the axis of said rod-like member.

12. A self-drilling dowel, as set forth in claim 9, wherein said second part of said spreader having an axial length sufficient at least to form a closure for the openings extending between said slots and said central bore.

13. A self-drilling dowel, as set forth in claim 12, wherein said first part of said spreader having a cylindrical shape and the diameter thereof being substantially equal to the diameter of said first part of said central bore so that said spreader can be driven through said central bore toward the leading end of said rod-like member in sliding contact with the surface of said first part of said central bore.

* * * * *